United States Patent [19]

Kondo

[11] 4,403,475

[45] Sep. 13, 1983

[54] WAVE ENERGY ABSORBER MOUNTABLE ON WAVE-FACING STRUCTURE

[75] Inventor: Hideo Kondo, Muroran, Japan

[73] Assignee: Muroran Institute of Technology, Hokkaido, Japan

[21] Appl. No.: 185,620

[22] Filed: Sep. 9, 1980

[30] Foreign Application Priority Data

Sep. 20, 1979 [JP] Japan .............................. 54-120083

[51] Int. Cl.³ .............................................. F03B 13/12
[52] U.S. Cl. ........................................ 60/398; 290/53; 405/76
[58] Field of Search ....................... 60/398; 290/42, 53; 405/76, 77

[56] References Cited

U.S. PATENT DOCUMENTS

| 888,721 | 5/1908 | Milbury . | |
|---|---|---|---|
| 916,860 | 3/1909 | Hale | 417/330 |
| 956,796 | 5/1910 | Butler . | |
| 970,048 | 9/1910 | Harmon . | |
| 1,887,316 | 8/1931 | Lockfaw . | |
| 3,928,771 | 12/1975 | Straumsnes | 290/42 |
| 4,034,231 | 7/1977 | Conn et al. | 290/53 |
| 4,115,034 | 9/1978 | Smith . | |

*Primary Examiner*—Gerald A. Michalsky
*Attorney, Agent, or Firm*—Spencer, Kaye & Frank

[57] ABSTRACT

A wave energy absorber comprising a caisson mountable on the seaside surface of an existing breakwater or coastal embankment, which caisson has a water chamber with an open side and a rear wall facing the open side. The distance from the open side to the rear wall is longer than one quarter of a wavelength $L_c$ in the water chamber so as to generate a standing wave in the water chamber with a node of the standing wave at a distance $L_c/4$ from the rear wall toward the open side. A wave-power turbine impeller is pivotally supported in the caisson at the node position, the impeller rotating in only one direction, whereby wave energy is absorbed by the impeller for further conversion into electric or thermal energy. The caisson itself can also be utilized as a breakwater or an embankment.

6 Claims, 8 Drawing Figures

FIG_1

WAVE ENERGY ABSORBER MOUNTABLE ON WAVE-FACING STRUCTURE

BACKGROUND OF THE INVENTION

1. Field of the Invention

This invention relates to a wave energy absorber or a wave-power converter mountable on a wall structure to break waves, and more particularly to a resonant type wave energy absorber mountable as a part of a breakwater, a coastal embankment, or similar wall structure at a minimum installation cost and with a maximum energy absorbing efficiency for extracting low-cost energy from waves such as ocean waves. The output from the wave energy absorber of the invention can be used in the form of electric power by energy conversion through an electric power generating means attached to the wave energy absorber or can be stored in the form of oil pressure by energy conversion through a hydraulic means attached to the wave energy absorber.

2. Description of the Prior Art

Wave energy absorbers which have been proposed heretofore can be generally classified into the categories of Table 1.

TABLE 1

| Place of installation and construction | Dynamics |
|---|---|
| I. Coastal fixed construction | 1. Passive type |
| II. Offshore float construction | 2. Resonant type |

From the standpoint at efficiency of energy extraction, it is well known that the second type of dynamics, i.e., the resonant type, of the aforementioned classification of Table 1 is better than the passive type. However, most of the conventional wave energy absorbers of the resonant type are built in the form of the offshore float construction, i.e., the category II of Table 1, which construction is inherently costly because a large floating body is required and because the difficult problem of mooring the floating body remains unsolved. On the other hand, a coastal fixed construction can be built as a part of a breakwater, a coastal embankment or the like with a considerable saving in the installation cost, but only the dynamically passive type has been proposed for the coastal fixed construction and the resonant type coastal fixed construction has never been proposed.

SUMMARY OF THE INVENTION

Therefore, an object of the present invention is to provide an economical resonant type wave energy absorber of coastal fixed construction.

The present invention is based on a finding that wave energy can be efficiently absorbed or extracted through an impeller rotating in only one direction in a caisson. According to the present invention, one or more caissons are mounted to a breakwater, a coastal embankment, or the like as an integral part thereof, each of which caissons has a water chamber defined therein by a bottom wall, an open side, a rear wall facing said open side, at least two sidewalls with said open side and said rear wall therebetween, and an open portion at the top thereof, said water chamber in each caisson having a length longer than one quarter of a wavelength $L_c$ in the water chamber so that a standing wave is formed in the water chamber with a node of the standing wave at a distance $L_c/4$ from the rear wall toward the open side; and one or more wave-power turbine impellers are pivotally supported by each of said caissons at a position coinciding with said node of the standing wave. The present invention is based on the important finding that the impellers thus disposed in the aforementioned caisson rotate in a certain direction, so as to efficiently absorb wave energy. Accordingly, the wave energy absorbed by the impellers as rotation thereof can be converted into electric power or thermal energy at low cost. Means for converting the wave energy from the rotation of the impellers into electric power or into thermal energy can be any suitable converters of the prior art, but the part of the caisson at which the wave-power turbine impeller is disposed to maximize the efficiency of wave energy extraction is an important key point of the invention.

BRIEF DESCRIPTION OF THE DRAWING

For a better understanding of the invention, reference is made to the accompanying drawing, in which.

Like parts are designated by like numerals and symbols throughout different views of the drawing.

DESCRIPTION OF THE PREFERRED EMBODIMENTS

Figure 1:
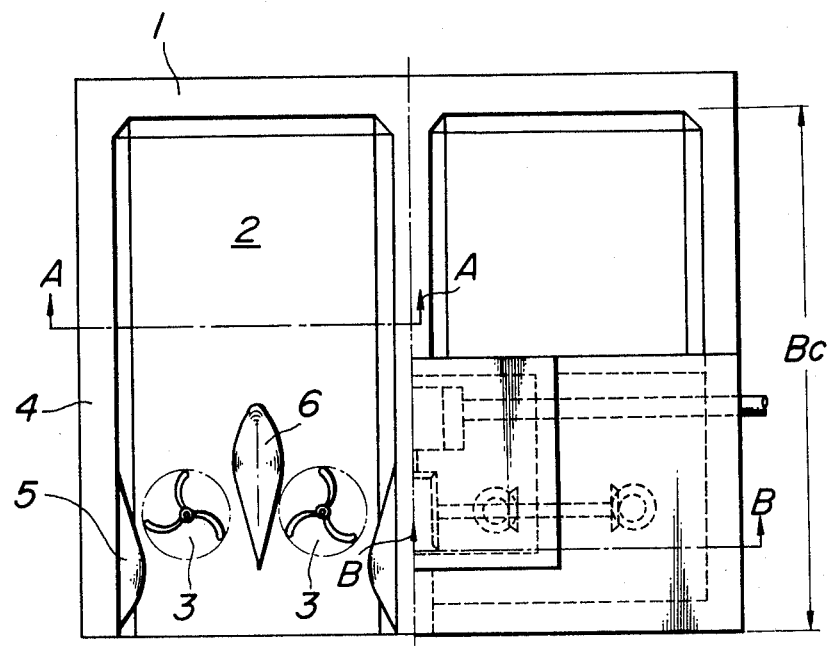
FIG. 1 is a plan view of a wave energy absorber according to the present invention, with a part thereof shown in section.
Figure 2:
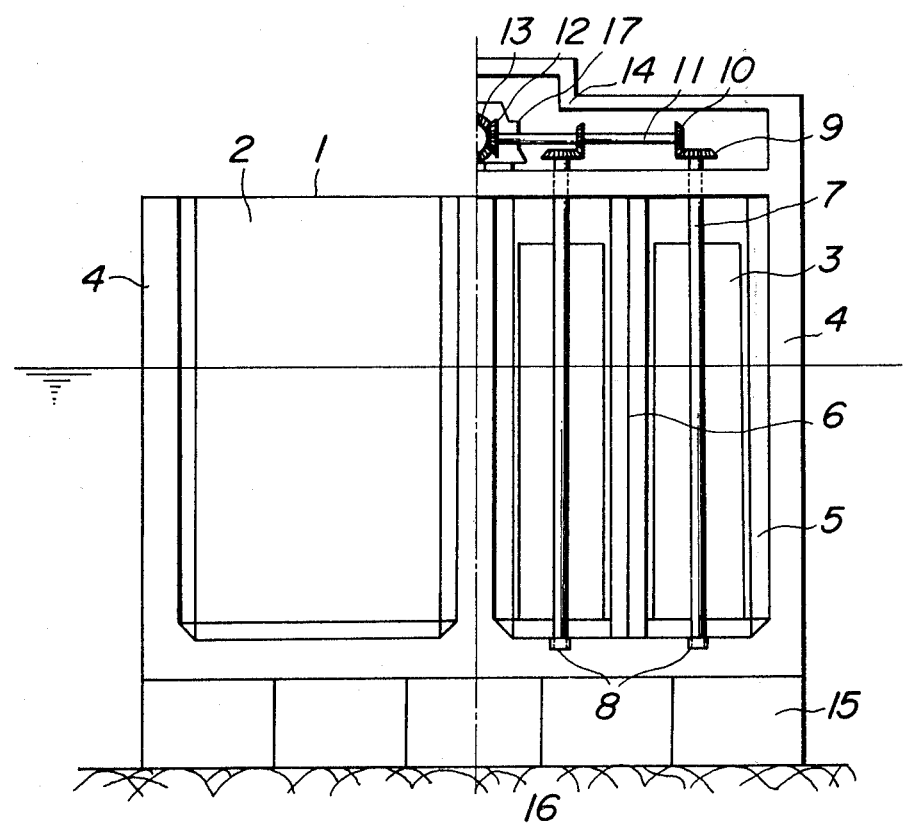
FIG. 2 is an elevation, with one half thereof in section, of the wave energy absorber of FIG. 1.
Figure 3:
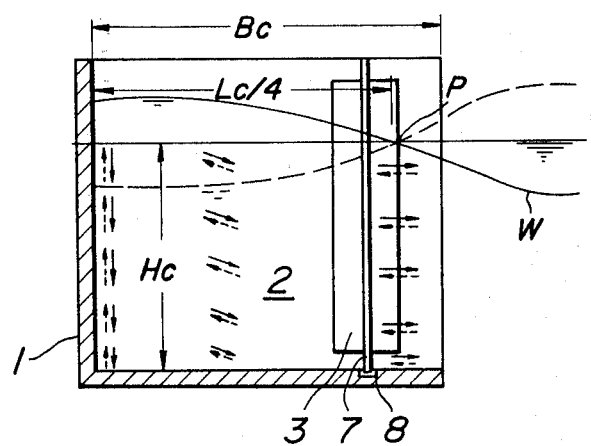
FIG. 3 is a schematic diagram showing the principles relating to the relationship between a wave in a wave chamber and the position of a wave-power turbine impeller therein.

Referring to FIG. 1 through FIG. 3, a caisson 1 such as a steel reinforced concrete caisson is adapted to function as a part of a breakwater or a coastal embankment and has an open side which is so disposed as to face the sea. The caisson 1 also has an open top. To absorb or extract wave energy, a water chamber 2 is defined in the caisson 1 in such a manner that a standing wave is generated therein with a node thereof at a position of one quarter of the wavelength $L_c$ from the rear wall. If a wave-power turbine impeller 3 is disposed at the aforementioned node position of the water chamber 2, the impeller 3 rotates in only one direction because the horizontal velocity components of the water particles are maximized at the position of the impeller 3. This is a phenomenon which was found by the inventor. Based on this newly found phenomenon, the present invention enables absorption or extraction of wave energy from sea water by using the aforementioned rotation of the impeller 3, and the wave energy thus absorbed can be converted into electric power or stored in the form of oil pressure by driving an oil pressure pump, which oil pressure can be further converted into thermal energy.

Referring to FIGS. 1 and 2, the caisson 1 has sidewalls 4, and flow-contracting side boards 5 are secured to the inside surfaces of the sidewalls 4. An intermediate flow-contracting board 6 is disposed between the two impellers 3, 3 in the illustrated embodiment. Each impeller 3 has an impeller shaft 7 which is journaled by a bearing 8. A gear 9 secured to the top end of the impeller shaft 7 meshes another gear 10 secured to a horizontal shaft 11. The horizontal shaft 11 carries another gear 12 secured thereto so as to mesh a gear 13 of an energy converter to be described later. An energy converter housing 14 is mounted on the top of the caisson 1. Wavelength-adjusting blocks 15 are disposed on a foundation mound 16, and the caisson 1 is placed on the wavelength-adjusting blocks 15.

In the wave energy absorber of the present invention, the shaft 7 of the wave-power turbine impeller 3 can be disposed either vertically or horizontally, but the vertical disposition of the impeller shaft 7 makes the handling easy. The impeller 3 can be made of steel or fiber-reinforced plastics (FRP). Two or more whirl-shaped blades are secured to the impeller 3. When the flow-contracting side boards 5 are secured to the sidewalls 4 and the intermediate flow-contracting board 6 is disposed between the adjacent impellers 3, 3 as shown in FIG. 1, the flow rate of water at the position of the impellers 3, 3 is so increased and directed that forces to rotate the impellers 3, 3 are intensified. The flow-contracting boards 5 and 6 can be made of steel, FRP, or concrete.

Figure 4:
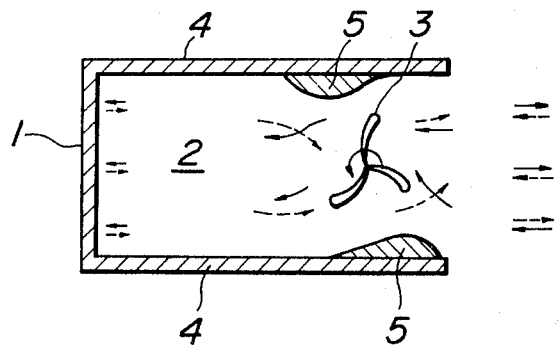
FIG. 4 is an explanatory view showing the distribution of maximum rates of flow on a plane in a caisson to be used in the wave energy absorber of the present invention.

Referring to FIG. 4, when surfaces of the two flow-contracting side boards 5 are indentically streamlined but disposed on the sidewalls 4 so as to extend in opposite directions from the positions closest to the impeller 3 as shown in the figure, the flow rate of water on the right-hand side of the impeller 3 as seen from the sea to the coast is increased, so that the tendency to rotate the impeller 3 in only one direction is enhanced. In the case of the embodiment of FIG. 1, the streamlined surfaces of the two flow-contracting side boards 5 extend in the same directions, and if the direction of the intermediate flow-contracting board 6 is reversed from the illustrated disposition, the tendency of rotating the impeller 3 in only one direction is enhanced. The revolving force of the impellers 3 is transmitted to an energy converter 17 through a train of the aforementioned gears 9, 10, 12, and 13, to convert the wave energy into electric power or to store the wave energy by converting it into oil pressure or thermal energy.

In the embodiment of FIG. 1, if the top of the caisson 1 is not fully open, it is desirable to provide an open portion at that area of the top of the caisson 1 which is adjacent the coast-side rear wall of the caisson 1. The reason is that, if the aforementioned area of the top of the caisson 1 is closed, the wave can be reflected at the rear wall but the water flow in the water chamber 2 becomes turbulent and turbulent flow in the water chamber 2 is not desirable. To rotate the wave-power turbine impeller 3 always in one direction, it is necessary to keep the node of the standing wave in the water chamber 2 at a constant location, because the standing wave with the node at the constant location causes the wave-power turbine impeller 3 to rotate in one direction.

Therefore, it is important in the present invention to keep a proper relationship between the position of the impeller 3 and length $B_c$ of the water chamber 2 of the caisson 1. More specifically, unless the water chamber length $B_c$ of the caisson 1 as shown in FIG. 3 is longer than one quarter of a wavelength $L_c$ in the water chamber, the desired effect of the present invention cannot be achieved. Accordingly, if the period T of a subject wave is large, to prevent the water chamber length $B_c$ of the caisson 1 from becoming too large, it is necessary to dispose the wavelength-adjusting blocks 15 such as concrete blocks under the caisson 1 so as to reduce the wavelength $L_c$ in the water chamber 2.

Generally speaking, the energy of a water wave consists of potential energy and kinetic energy. In the case of a progressive wave, water particles move along elliptic orbits, and direct absorption or extraction of the progressive wave energy is difficult. When a progressive wave collides with a vertical wall, such as the rear wall of the caisson 1, a standing wave W is formed as shown in FIG. 3, and a node P of the standing wave is located at a distance $L_c/4$ l from the rear wall toward the sea, $L_c$ being the wavelength of the standing wave in the water chamber. The wavelength $L_c$ can be approximated with that of small amplitude waves without loss, $L_{cA}$, given by $$L_{cA} = (gT^2/2\pi) \tan h(2\pi h_c/L_{cA})$$

provided the flow resistance due to impellers and boards is negligible. Here, g is the gravitational acceleration (9.8 m/sec$^2$), T is the period of the standing wave, tanh stands for hyperbolic tangent, and $h_c$ is the height of the water level in the water chamber from the bottom wall of the water chamber. At the position of the node P, the entire energy of the water particle is the kinetic energy and the orbits of the water particles are horizontal, so that the energy of the water particles can be absorbed or extracted comparatively easily. It has been found through experiments that when the impeller 3 is placed in the water chamber 2, resistance is caused against the movement of the water particles, and the wave length $L_c$ is somewhat shorter than the wavelength, $L_{cA}$, given above. When the water-power turbine impeller 3 is placed at the position of the node P of the standing wave, the velocity of the water particle at the node P does not have any vertical component, so that a revolving force in a certain direction can be achieved. More particularly, the orientation of the velocity of the water particle in the standing wave is reversed in each period of the standing wave, as shown by solid line arrows and dot-line arrows in FIG. 3, but the asymmetric shape of the impeller blades allows the impeller 3 to rotate always in the aforementioned certain direction. The revolving force of the wave-power turbine thus obtained is transmitted to an energy converter 17, e.g., an electric generator, through a gear train or the like while increasing the speed of rotation.

Since the wave energy absorber of the present invention is of the dynamically resonant type, a suitable wavelength $L_c$ in the water chamber 2 of the caisson 1 can be selected so as to meet any wave characteristics at the site for installation thereof, and one or more wave-power turbine impellers 3 are disposed at the position of the node P of a standing wave in the caisson 1, whereby the wave-power turbine impellers 3 rotate in the certain direction to absorb the wave energy.

Figure 5A:
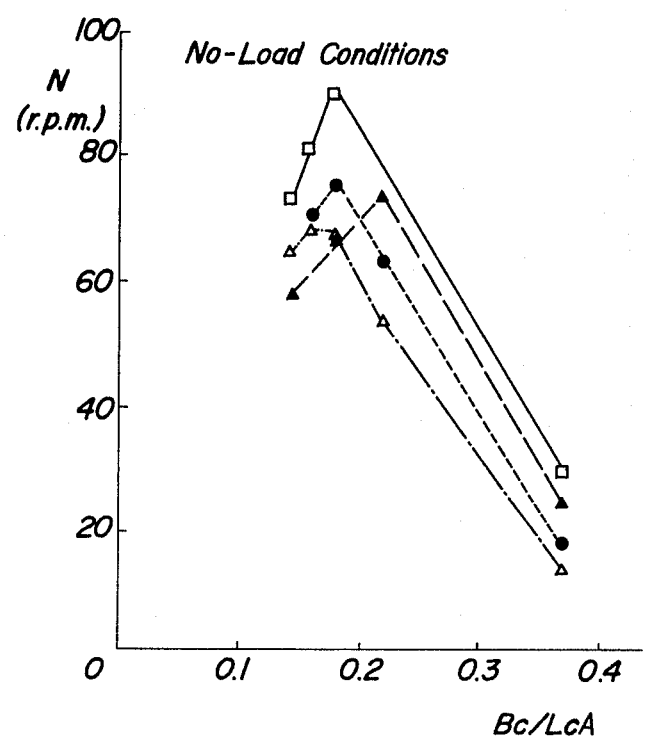
FIGS. 5A and 5B are graphs obtained from a preliminary experiment, showing the effects of relative water chamber length $B_c/L_{cA}$ on the revolving speed N of an impeller and power gain ratio respectively in the wave energy absorber according to the present invention.
Figure 5B:
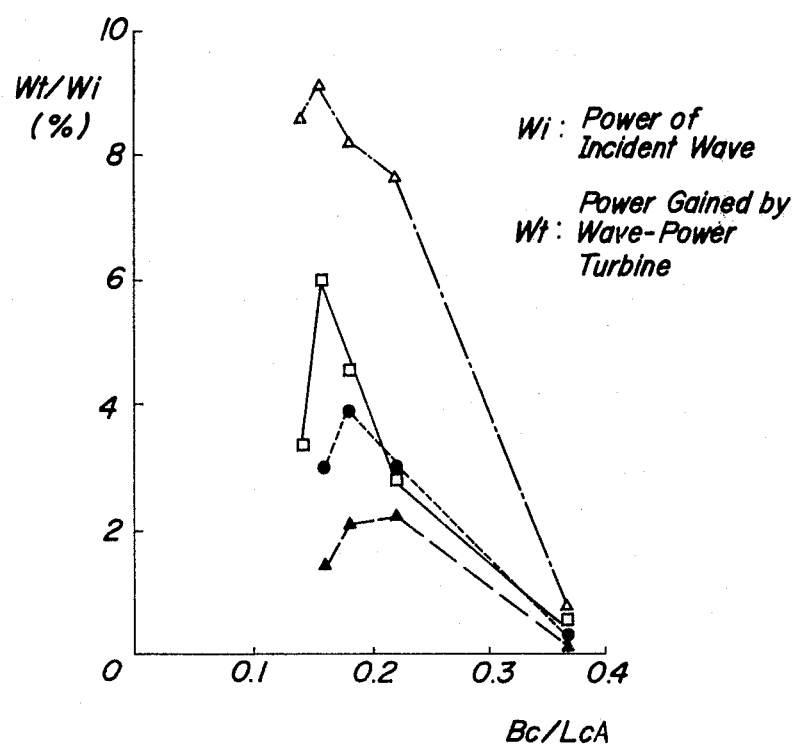

To check the efficiency of the wave energy absorber according to the present invention, laboratory tests were made to measure the rotational speed of the wave-power turbine impeller and the ratio between incident wave power and power absorbed by the wave energy absorber. The results of the laboratory tests are shown in the graphs of FIGS. 5A and 5B. In the graph of FIG. 5B, $W_i$ stands for power of the incident wave, while $W_t$ stands for power gained by the wave-power turbine of the wave energy absorber. The graph of FIG. 5A shows the effect of the relative water chamber length in terms of $B_c/L_{cA}$, $B_c$ being the water chamber length and $L_{cA}$ being the small amplitude wavelength in the water chamber without loss, on the rotational speed N of the wave-power turbine impeller. The graph of FIG. 5B shows the effect of the aforementioned relative water chamber length $B_c/L_{cA}$ on the gained power-incident power ratio $W_t/W_i$. Table 2 summarizes the constructions of the impellers and the flow contacting board which were used in the laboratory tests.

TABLE 2

| Symbol | Impeller | Flow-contracting board |
|---|---|---|
| ● | with 2 big blades | not provided |
| ▲ | with 3 big blades | not provided |
| △ | with 3 big blades | provided |
| □ | with 3 small blades | not provided |

As can be seen from FIGS. 5A and 5B, the no-load rotational speed N of the wave-power turbine impeller of the wave energy absorber can be maximized when the relative water chamber length $B_c/L_{cA}$ is in the proximity of $B_c/L_{cA} \gtrsim 0.2$ and the gained power-incident power ratio $W_t/W_i$ can be maximized when the relative water chamber length $B_c/L_{cA}$ is in the region of $B_c/L_{cA} \leq 0.2$. Thus, the laboratory tests proved the aforementioned dynamic characteristics of the standing wave.

Though the ratio in the preliminary experiment is not high, it will be improved with employment of suitable blades and boards.

The installation of the wave energy absorber of the invention as an integral part of a breakwater, a coastal embankment or similar wall structure will strengthen the function of such wall structures but will never weaken such wall structures. An embodiment of the wave energy absorber according to the present invention gives a reflection coefficient of 30% to 50%, which is comparable with the corresponding values obtained by conventional breakwaters of the vertical wave-absorber type to disperse wave energy as turbulent flow.

With the conventional wave energy absorber of offshore float construction, its installation cost tends to inflate the cost of the energy extracted from the ocean wave. On the other hand, according to the present invention, the installation cost of the wave energy absorber is greatly reduced by mounting it as an integral part of a breakwater, a coastal embankment or similar wall structure to breakwater, so that the wave energy can be absorbed or extracted at low cost.

Several thousands of kilometers of breakwaters and coastal embankments are built every year all over the world. If the wave energy absorber of the present invention is incorporated in some of the breakwaters and coastal embankments, the renewable energy resources will be certainly strengthened. The wave energy absorber of the present invention is particularly suitable for electric power generation at inaccessible remote islands and isolated areas.

Figure 6:
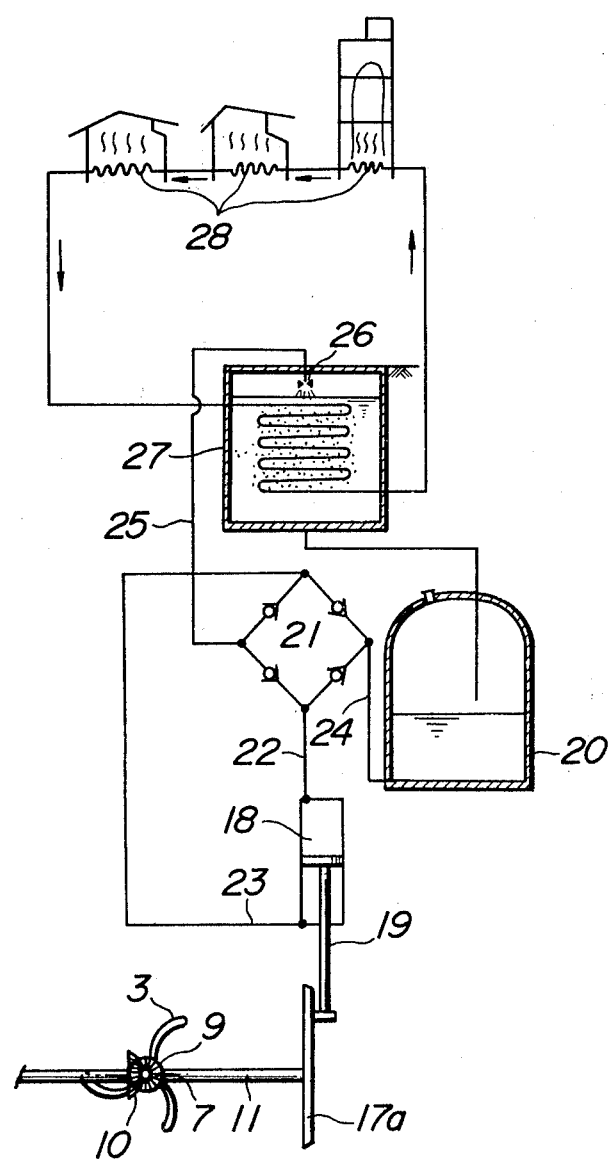
FIG. 6 is a schematic diagram of another embodiment of the present invention.

FIG. 6 shows a hot-water heating system using oil pressure to be actuated by the wave energy absorber of the present invention. In the figure, the rotation of a wave-power turbine impeller 3 is transmitted to a horizontal shaft 11 through a gear 9 secured to one end of a rotary shaft 7 of the impeller 3 and another gear 10 secured to the horizontal shaft 11 so as to mesh the gear 9. A flywheel 17a is secured to the opposite end of the horizontal shaft 11, and a piston 19 of an oil hydraulic cylinder 18 is pivotally connected to the flywheel 17a, so that the rotation of the horizontal shaft 11 causes the piston 19 to reciprocate in the hydraulic cylinder 18. An oil tank 20 is connected to the oil hydraulic cylinder 18 through a changeover valve mechanism 21 and oil passages 22, 23 and 24. The oil passages 22 and 23 extend between the oil hydraulic cylinder 18 and the changeover valve mechanism 21, while the oil passage 24 connects the oil tank 20 to the changeover valve mechanism 21. The output from the changeover valve mechanism 21 is delivered to a nozzle 26 through an oil passage 25, which nozzle 26 jets the pressurized oil to a heat exchanger 27 connected to hot-water heating pipes 28 for individual buildings. FIG. 6 shows that as the compressed high-pressure oil is jetted into the heat exchanger 27 through the nozzle 26, the potential energy of the waves is converted into heat energy through the kinetic energy of the flywheel 17a and heat energy in the cylinder 18 generated by particle collisions and fluid friction. As a result, heat is delivered to the hot-water heating pipes 28.

Figure 7:
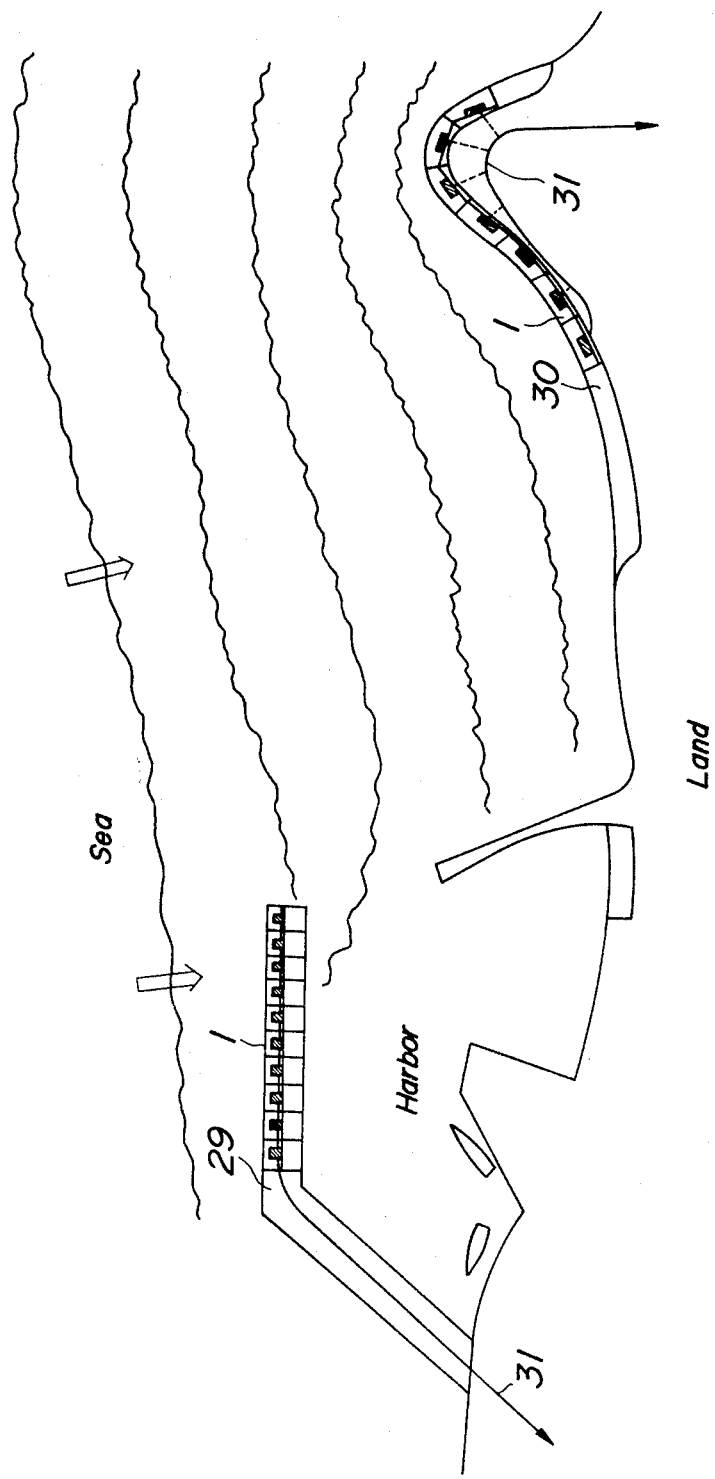
FIG. 7 is a diagrammatic illustration of the manner in which wave energy absorbers of the present invention are applied to a breakwater and a coastal embankment.

FIG. 7 illustrates an electric power generating system using wave energy absorbers of the present invention for driving electric generators (not shown). In the figure, a plurality of caissons 1 with wave energy absorbers according to the present invention are installed as an integral part of a breakwater 29 and as an integral part of a coastal embankment 30. The output from those wave energy absorbers in the caissons 1 drives electric generators (not shown), so as to convert the wave energy into electric power which is sent out through electric power transmission lines 31.

Rough calculations show that when 7 meter high waves are continuously available, electric power of 147 kw per meter of wave front in a theoretical regular wave and 77 kw per meter of wave front in an actual irregular wave can be produced by conversion of the wave energy provided that the efficiency is 30%. If a caisson having a wave energy absorber of the invention is installed on a breakwater for both breaking water and absorbing wave energy at a presumed construction cost of about 20,000 U.S. dollars per meter, then the installation cost of the wave energy absorber in this case will be about 5,000 U.S. dollars per meter. If a wave energy absorber of the invention is built in a 10 meter wide caisson of one block structure and installed on a breakwater facing 2 meter high waves, the wave energy can be absorbed at a rate of about 60 kw provided that the efficiency is 30%.

Experiments are currently being conducted on offshore float type wave energy absorber of conventional construction in the Sea of Japan by using an 80 meter long floating body with a target output of 2,000 kw, namely, 25 kw/m. The construction cost of the aforementioned floating body named KAIMEI is about 200 million yen (about 1 million U.S. dollars), and its cost per unit length is about 3 million yen (about 15,000 U.S. dollars) per meter including mooring facilities therefor.

In short, when the wave energy absorber of the present invention is used as a part of caisson portions of a breakwater or a coastal embankment, the construction cost of a wave energy absorbing installation can be greatly reduced. The wave energy absorber of the present invention is different from the offshore float type systems in that the wave energy absorber of the invention is particularly advantageous for application to long wave fronts such as long breakwaters and long coastal embankments.

Although the invention has been described with a certain degree of particularity, it is understood that the present disclosure has been made only by way of example and that numerous changes in details of construction and combination and arrangement of parts may be resorted to without departing from the scope of the invention as hereinafter claimed.

What is claimed is:

1. A resonant type apparatus for absorbing wave energy, said apparatus being an integral part of a fixed coastal structure, comprising
    a caisson having
    a rear wall secured to said fixed coastal structure, said rear wall facing the sea;
    a bottom wall attached to the lower part of said rear wall and extending toward the sea;
    at least two sidewalls attached to said rear and bottom walls, said rear wall being located between said side walls to form a water chamber open at the end facing the sea and at least partially open at the top, the length of said chamber being longer than one-quarter of the wavelength $L_c$ of a standing wave in said water chamber, said standing wave having a node at a distance $L_c/4$ from said rear wall measured toward the open end of said water chamber;
    a wave-power turbine impeller rotatably supported by said caisson at a position coinciding with the position of said node; and
    means for limiting the rotation of said impeller to a single direction, whereby the energy of waves incident on said caisson is absorbed by said impeller as rotational energy thereof.

2. An apparatus as set forth in claim 1 wherein said means for limiting the rotation of said impeller to a single direction comprises flow-contracting side boards secured to said sidewalls at positions facing said impeller.

3. An apparatus as set forth in claim 2 wherein said flow-contracting side boards have identical cross-sectional slopes and are secured to said sidewalls in identical orientations.

4. An apparatus as set forth in claim 2 wherein said flow-contracting side boards have identical cross-sectional slopes and are secured to said sidewalls in opposite orientations.

5. An apparatus as set forth in claim 1 wherein at least two wave-power turbine impellers are provided, and wherein said means for limiting the rotation of said impellers to a single direction comprises at least one intermediate flow-contracting board disposed between said impellers.

6. An apparatus as set forth in claim 5 which further comprises flow-contracting side boards secured to said sidewalls at positions facing said impeller.

* * * * *